(12) United States Patent
Burbidge et al.

(10) Patent No.: US 6,317,239 B1
(45) Date of Patent: *Nov. 13, 2001

(54) OPTICAL REPEATERS FOR SINGLE- AND MULTI-WAVELENGTH OPERATION WITH DISPERSION EQUALIZATION

(75) Inventors: Douglas S. Burbidge, Kanata; Bernard Villeneuve, Aylmer, both of (CA)

(73) Assignee: Nortel Networks Limited, Montreal (CA)

( * ) Notice: Subject to any disclaimer, the term of this patent is extended or adjusted under 35 U.S.C. 154(b) by 0 days.

This patent is subject to a terminal disclaimer.

(21) Appl. No.: 09/189,992

(22) Filed: Nov. 12, 1998

Related U.S. Application Data

(63) Continuation-in-part of application No. 08/655,399, filed on May 30, 1996, now Pat. No. 5,917,635.

(51) Int. Cl.$^7$ ................ H04B 10/18; H04J 14/02
(52) U.S. Cl. ................ 359/161; 359/179; 359/124; 359/348; 359/349; 385/37
(58) Field of Search ................ 359/179, 161, 359/173, 339, 348, 349, 347; 385/37

(56) References Cited

U.S. PATENT DOCUMENTS 4,953,939 * 9/1990 Epworth ................ 359/130
5,917,635 * 6/1999 Cvijetic et al. ................ 359/179

* cited by examiner

*Primary Examiner*—Leslie Pascal
(74) *Attorney, Agent, or Firm*—Angela C. de Wilton; Victoria Donnelly

(57) ABSTRACT

An optical repeater is described which integrates an erbium doped optical fiber amplifier (EDFA) with a dispersion equalizer (DE) based on fiber gratings. The dispersion equalizer is based on parallel connection of a plurality of fiber gratings, or on parallel connection of a cascaded plurality of fiber grating branches, each branch carrying a plurality of gratings coupled in series. Each grating in each branch is chirped to provide selective reflection at one of the plurality of signal carrier wavelengths so that the total optical bandwidth of the dispersion equalizer is enhanced, i.e. the total bandwidth for a specific signal carrier wavelength is the combined optical bandwidths of the gratings which provide the reflection at the wavelength. The use of multiple gratings for each wavelength improves the optical bandwidth of the equalizer compared with single grating designs, enhancing the effective bandwidth. Further, the grating DE is disposed between two fiber amplifier lengths which share a single pump laser. Thus, this arrangement provides dispersion compensation and loss compensation in an optical repeater of lower cost, and smaller size, compared to a system of similar performance configured using discrete components.

16 Claims, 7 Drawing Sheets

OPTICAL REPEATERS FOR SINGLE- AND MULTI-WAVELENGTH OPERATION WITH DISPERSION EQUALIZATION

This application is a Continuation-in-Part of U.S. patent application Ser. No. 08/655,399 to Cvijetic M. et al, filed May 30, 1996 now U.S. Pat. No. 5,917,635 and incorporated herein by reference.

FIELD OF INVENTION

The present invention relates to optical repeaters and dispersion equalizers for single- and multi-wavelength operation, with particular application to wavelength division multiplex (WDM) optical telecommunication systems operating at bit rates in the range from 2.5 Gb/s to 10 Gb/s per carrier wavelength.

BACKGROUND OF THE INVENTION

Existing optical fibre networks are based primarily on non-dispersion shifted fiber (NDSF). For wavelength division multiplex (WDM) optical communications systems, chromatic dispersion induced during optical signal propagation through NDSF fibers is a major constraint which limits the length-bandwidth product in an optical communication system operating in the 1550 nm wavelength region.

Dispersion compensation in the 1550 nm wavelength region is an attractive way to overcome this constraint. Various schemes are known to have been suggested or employed for dispersion compensation.

The conventional approach, employing a length of dispersion compensating fiber (DCF) is widely used. Other compensators are known based on fibre gratings, optical interferometers, or cascades of birefringent optical fibers.

To overcome losses in a preceding optical fiber span and in a dispersion compensating element, a dispersion compensating element is used in combination with one or two erbium doped fiber amplifiers, each requiring a pump laser. The latter combination is conventionally used either in discrete or integrated form, with a dispersion compensating fiber. The result is expensive and large sized repeater equipment.

Use of an optical fiber grating as a dispersion equalizer instead of dispersion compensating fibre has the potential for lower cost, but the drawback of known dispersion equalizers based on grating systems is the narrow optical bandwidth and resultant high sensitivity for carrier frequency fluctuations. For example, an optical fibre transmission system using a chirped Bragg reflector and directional coupler for dispersion equalization is described in U.S. Pat. No. 4,953,939 entitled "Optical Fibre Transmission Systems" to Epworth. Epworth uses a piece of fibre in which reflective properties of the grating are graded along the length of the piece of fibre. Different sections of the piece of fibre reflect different optical frequencies and this system provides limited bandwidth. Also, in practice, each optical fiber grating based dispersion equalizer requires an optical amplifier for loss compensation.

The optical bandwidth of a chirped fiber grating is directly proportional to the length of the grating. Given a practical length limitation based upon grating stability and/or manufacturability, the desired optical bandwidth determines the grating chirp parameter, which in turn determines the amount of dispersion compensation from the fiber grating. In known systems, increased dispersion compensation can be achieved only at the expense of optical bandwidth for a given grating length.

SUMMARY OF THE INVENTION

The present invention seeks to provide an optical repeater for single- and multi-wavelength operation with dispersion equalization, which overcomes or avoids the above-mentioned problems.

According to one aspect of the invention there is provided an optical repeater, comprising:

a dispersion equalizer comprising an optical coupler having an input port, an output port and cascaded M optical fiber grating branches coupled in parallel through the optical coupler, and first and second lengths of an optical fiber amplifier coupled to the input port and output port respectively of the optical coupler, means for coupling an input optical signal into the first section of the optical fiber amplifier and means for coupling an output optical signal from the second section of the optical fiber amplifier, each of M optical fiber grating branches comprising a series of N gratings, each grating being designed to selectively reflect one of the series of signal carrier wavelengths $\lambda_a, \lambda_b, \lambda_c, \ldots \lambda_N$, to form a cascade of N wavelength selective grating stages of M elements each, each grating within the grating stage is chirped so that the total optical bandwidth of the equalizer for the stage is the combined optical bandwidths of the gratings within the stage.

Thus, dispersion equalization is provided by the plurality of fiber grating branches that are cascaded so that the bandwidth of the equalizer for a particular stage is enhanced relative to the same amount of dispersion compensation using a single grating approach, e.g. is a multiple of a single grating bandwidth. The insertion loss of the equalizer is efficiently compensated by inserting it between two sections of a fiber amplifier.

Preferably, the fiber amplifier comprises first and second lengths of an erbium doped fiber, and both lengths of fiber are coupled to a single laser source. Because only one pump laser source is required, the cost is substantially reduced. Thus, the optical repeater provides optical loss compensation and chromatic dispersion compensation, while enhancing the bandwidth relative to conventional systems using a grating for dispersion equalization.

Advantageously, the optical repeater is provided for multi wavelength operation, e.g. for a WDM system operating with a plurality of wavelengths. Alternatively, the repeater may provide a single wavelength operation, e.g. when N=1. Conveniently, the gratings have equal bandwidths. Alternatively, they may have unequal bandwidths depending on the requirements for dispersion compensation. Preferably, each grating is an in-fiber Bragg grating with linear chirp. Alternatively, gratings having non-linear chirp are also applicable for dispersion compensation. By way of example, a dispersion equalizer may comprise three fiber grating branches, each branch including one of the first, second and third gratings respectively.

Various modifications to the optical repeater structure described above are possible, including variations in number of branches and number of gratings in each branch. For example, an optical repeater for two or more signal carrier wavelengths may include three fiber grating branches (M=3), each branch having two gratings coupled in series (N=2). Each grating may be chirped for a specific one of the signal carrier wavelengths to reflect one of the two signal carrier wavelengths and transmit the other wavelength. Similarly to the above, an optical repeater having three branches (M=3) with four gratings in each branch (N=4) may also be provided. Another example may include an optical repeater having a three branch (M=3) equalizer for four wavelength (N=4) operation. While the system could be extended for multiple wavelength operation with more than four branches, practical considerations would usually limit the number of fiber grating branches and number of gratings in each branch in the optical repeater to provide the required parameters of the system, e.g. compactness and stability of its operation.

According to another aspect of the invention there is provided a dispersion equalizer, comprising:

an optical coupler having an input port, an output port and cascaded M optical fiber grating branches coupled in parallel through the optical coupler, each of M optical fiber grating branches comprising a series of N gratings, each gratings being designed to selectively reflect one of the series of signal carrier wavelengths $\lambda_a, \lambda_b, \lambda_c, \ldots \lambda_N$, to form a cascade of N wavelength selective grating stages of M elements each, each grating within the grating stage is chirped so that the total optical bandwidth of the equalizer for the stage is the combined optical bandwidths of the gratings within the stage.

Each optical fiber grating branch of the equalizer includes a single grating (N=1) to form a matched stage of M gratings. Conveniently, the number of branches of the repeater equals three (M=3).

Thus, an optical repeater providing dispersion equalization and loss compensation is provided, based on cascaded fiber grating branches, which offers improved optical bandwidth, a reduction in size, and reduced cost compared to known systems.

BRIEF DESCRIPTION THE DRAWINGS

Embodiments of the invention will now be described by way of example, with reference to the accompanying drawings, in which:

FIG. 1 shows an optical repeater according to a first embodiment of the present invention;

FIGS. 2a,b,c schematically show first, second and third branches of FIG. 1 with corresponding imprinted areas of fibre pieces being shaded;

FIG. 3 shows an optical bandwidth and dispersion curve for the optical repeater of the first embodiment;

FIG. 4a and 4b schematically show a four branch optical equalizer and optical bandwidth and dispersion compensation curve for such equalizer;

DESCRIPTION OF THE PREFERRED EMBODIMENTS

Figure 1:
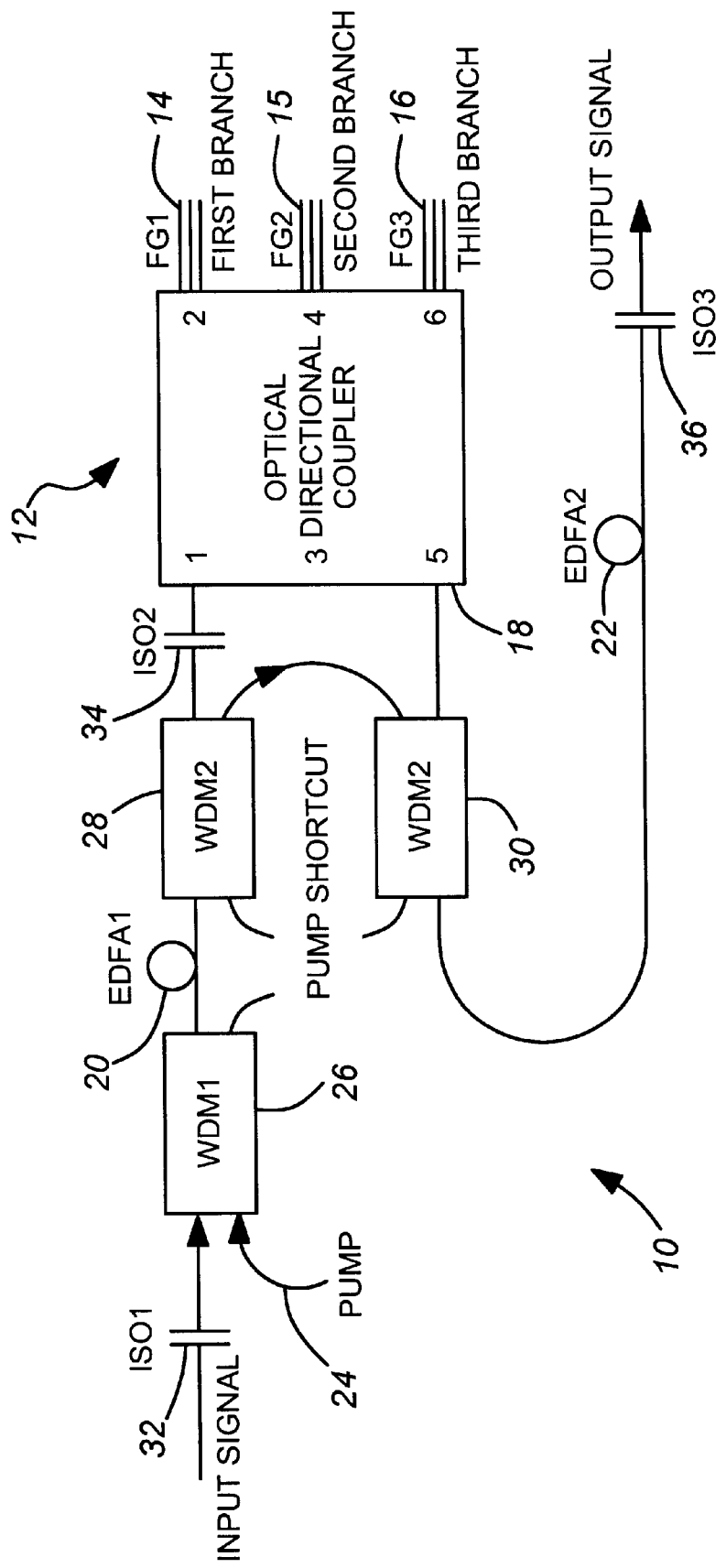

An optical repeater 10 according to a first embodiment of the present invention is shown schematically in FIG. 1 and comprises a single wavelength dispersion equalizer 12, which comprises a cascade of first, second and third optical fiber grating branches 14, 15 and 16 connected in parallel through a directional optical coupler 18, that is, coupled to three ports 2, 4 and 6 respectively of a 3×3 directional coupler 18. Port 3 of the coupler is not used (faked). Each of the fiber grating branches 14, 15 and 16 includes a single in-fibre Bragg grating FG1, FG2 and FG3 respectively with linear chirp resulting in a linearly decreasing pitch imprinted along a piece of fibre as will be described below.

The three branch dispersion equalizer 12 is coupled between sections of a conventional erbium doped fiber amplifier (EDFA), which is divided into first and second lengths 20 (EDFA1) and 22 (EDFA2), comprising an optical fiber heavily doped with erbium ions to a concentration of typically 1500 to 2500 ppm. For example, the first section 20 is 10 to 12 meters long and the second section 22 is 10 to 11 meters long. That is, a standard length of 20 to 25 meters of fiber is divided into two sections: the second part may be somewhat longer than the first part, i.e. by 1 to 2 meters, because it is pumped by a more attenuated pump signal.

The two lengths 20 and 22 of erbium doped fiber are pumped by a single pump laser 24 using three wavelength selective couplers 26, 28, and 30 (WDM1, WDM2 and WDM3) as shown in FIG. 1, to direct about 50% of the pump power into the first fiber section 20 (EDFA1), and about 50% into the section fiber section 22 (EDFA2).

Thus, an incoming optical signal from a preceding optical fiber span passes through a first optical isolator 32 (ISO1) through the first wavelength selective coupler 26 (WDM1) and into the first length of erbium doped fiber 20 (EDFA1). The signal passes through a second wavelength selective coupler 28 (WDM2) and enters the directional optical coupler 18 through a second optical isolator 34 (IS02) at port 1 of the directional coupler 18, is reflected at each of the dispersion gratings FG1, FG2 and FG3 at corresponding output ports 2, 4 and 6, exits the coupler 18 from port 5, and enters the second length of erbium doped fiber 22 through another wavelength selective coupler 30 (WDM3), exiting through the repeater through another optical isolator 36 (IS03).

Figure 2A:
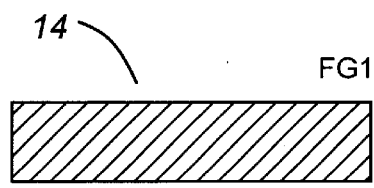
Figure 2B:
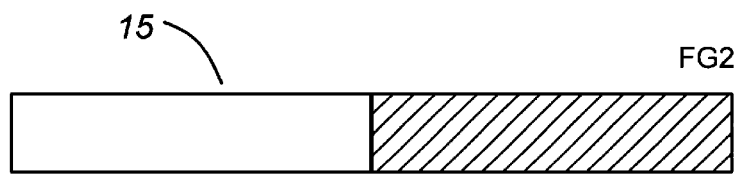
Figure 2C:

Each grating FG1, FG2 and FG3 is an in-fibre Bragg grating with linear chirp resulting in a linearly decreasing pitch imprinted along a piece of fibre as shown in FIG. 2. Grating FG1 is imprinted along the entire length of the corresponding piece of fiber as schematically illustrated in FIG. 2 by shading the imprinted area. Thus the effective length of the fibre, in the range of 3 cm to 3.3 cm, is the length of the in-fiber Bragg grating (FIG. 2a). The second fiber piece has a total length of 6 cm to 6.6 cm and grating FG2 is imprinted only along the second half of this piece, so that the length of the fibre Bragg grating FG2 is also 3 cm to 3.3 cm long (FIG. 2b). The third fiber piece has a total length of 9 cm to 9.9 cm, and grating FG3 is imprinted only along the third part of this piece, so that the length of the fibre grating FG3 is also 3 cm to 3.3 cm long (FIG. 2c).

Figure 3:
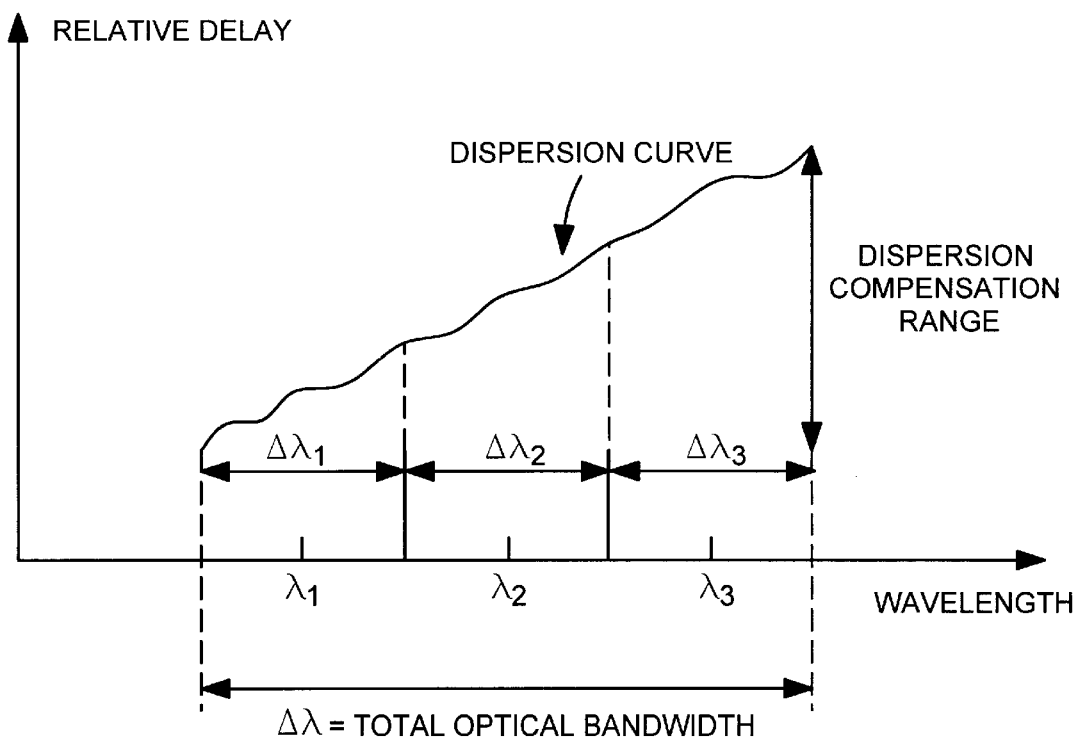

FIG. 3 shows an optical bandwidth and dispersion curve for the optical repeater 10 of the first embodiment. The grating FG1 is chirped over a bandwidth $\Delta\lambda_1$ to provide that the average product of its effective refractive index to the grating mechanical period corresponds to a wavelength $\lambda_1/2$. The grating FG1 provides selective reflection in an optical bandwidth $\Delta\lambda_1$ centered at $\lambda_1$ as illustrated in FIG. 3. At the same time, fiber gratings FG2 and FG3 are chirped to provide an average product of their effective refractive index to the grating mechanical period corresponding to wavelengths of $\lambda_2/2$ and $\lambda_3/2$ respectively, with $\Delta\lambda_2$ and $\Delta\lambda_3$ the corresponding bandwidths of gratings FG2 and FG3. The gratings FG2 and FG3 provide selective reflection in optical bandwidths $\Delta\lambda_2$ and $\Delta\lambda_3$ centered respectively at $\lambda_2$ and $\lambda_3$ so that the total optical bandwidth $\Delta\lambda$ of the equalizer 12 is the combined optical bandwidths of the gratings FG1, FG2 and FG3. Thus, in the optical repeater 10 according to the first embodiment of the invention three branches of fiber grating are cascaded so that the bandwidth of the repeater is effectively tripled (see FIG. 3) for the same amount of dispersion compensation, relative to a single grating approach, i.e. $\Delta\lambda = \Delta\lambda_1 + \Delta\lambda_2 + \Delta\lambda_3$.

Gratings FG1, FG2 and FG3 operate in reflection mode for the incoming optical signal, with means that shorter wavelengths within the signal spectral width travel further into the grating than longer wavelengths, if gratings operate in the 1530 to 1560 nm region. As a result, the transmission delay between longer wavelengths and shorter wavelengths within the spectral width of the signal is compensated. For grating parameters given earlier, the chirp constant of each grating is in the range from about 0.23 nm to 0.25 nm, resulting in the total bandwidth of the three branch equalizer equal to about 0.63 nm to 0.70 nm.

The optical repeater 10 employing the three branch dispersion equalizer 12 shown schematically in FIG. 1 can accept a signal carrier wavelength within the range from $\lambda_1 - (\Delta\lambda_1/2)$ to $\lambda_3 + (\Delta\lambda_3/2)$. The optical input signal can be composed of one or more carrier wavelengths within this range. The fiber grating FG1 will take over the dispersion compensation function for signal carrier wavelengths within the range $\lambda_1 - (\Delta\lambda_1/2)$ to $\lambda_1 + (\Delta\lambda_1/2)$. Similarly, fiber gratings FG2 and FG3 will take over the dispersion compensation function for respective signal carrier wavelength ranges $\lambda_2 - (\Delta\lambda_2/2)$ to $\lambda_2 + (\Delta\lambda_2/2)$ and $\lambda_3 - (\Delta\lambda_3/2)$ to $\lambda_3 + (\Delta\lambda_3/2)$.

The optical isolators 32, 34 and 36 (ISO1, ISO2 and ISO3) are included to prevent backward reflected signals from influencing the operation of the preceding elements. Each isolator preferably has insertion losses lower than 0.5 dB and backward attenuation higher than 30 dB. Conventional wavelength division multiplex couplers 26, 28 and 30 (WDM1, WDM2, WDM3) are used for pump injection into the optical fiber lengths 20 and 22.

The total losses inserted by the directional coupler and fibre grating elements, measured between ports 1 and 5 of the directional coupler, are in the range 11 dB to 14 dB. The pump signal by-passes the directional coupler 18 through which the signal passes, and the pump signal is diverted directly from the coupler 28 (WDM2) through to coupler 30 (WDM3). Optical losses inserted by WDM couplers 26, 28 and 30 are in the range 0.9 dB to 1.2 dB each.

With the grating parameters given earlier, the optical repeater is capable of compensating both the losses and chromatic dispersion from a preceding optical fiber span with a maximum length of about 80 to 105 km, and a total chromatic dispersion of 1700 to 1800 ps/nm. It is understood that other grating parameters, e.g. length, will give different dispersion compensation properties.

The total optical power of the pump is in the range 13 to 16 dBm at a signal carrier wavelength of 980 nm. The total gain in the first and second lengths of the erbium doped fiber are in the range 27 to 33 dB. The input signal is no lower than −15 dBm at a carrier wavelength.

Thus the insertion loss of the dispersion equalizer element is efficiently compensated by inserting it between two sections of fiber amplifier, which preferably share a common pump laser.

In the embodiment above the first branch containing grating FG1 provides selective reflection in the optical bandwidth $\Delta\lambda_1$ centered at $\lambda_1$ while the second and third branches contain gratings FG2 and FG3, chirped to provide reflection in the bandwidth above $\lambda_1 + (\Delta\lambda_1/2)$. Since optical coupler 18 is independent of wavelength, in another embodiment of the invention it is also contemplated that the second branch containing grating FG2, or alternatively, the third branch containing grating FG3, provide selective reflection in an optical bandwidth below $\lambda_1 + (\Delta\lambda_1/2)$ similar to that of the branch containing grating FG1 in the first embodiment. Alternatively, one of the first, second and third branches containing gratings FG1, FG2, FG3 may provide selective reflection in an optical bandwidth above $\lambda_1 + (\Delta\lambda_1/2)$, the total optical bandwidth of the equalizer being combined optical bandwidths of the three gratings. Instead of the optical repeater including fibre gratings which have equal bandwidth, i.e. $\Delta\lambda_1 = \Delta\lambda_2 = \Delta\lambda_3$, yet another alternative embodiment of the repeater may include gratings having unequal bandwidths, i.e. $\Delta\lambda_1 \neq \Delta\lambda_2 \neq \Delta\lambda_3$, where the required relation between the grating bandwidths is provided.

Figure 4A:
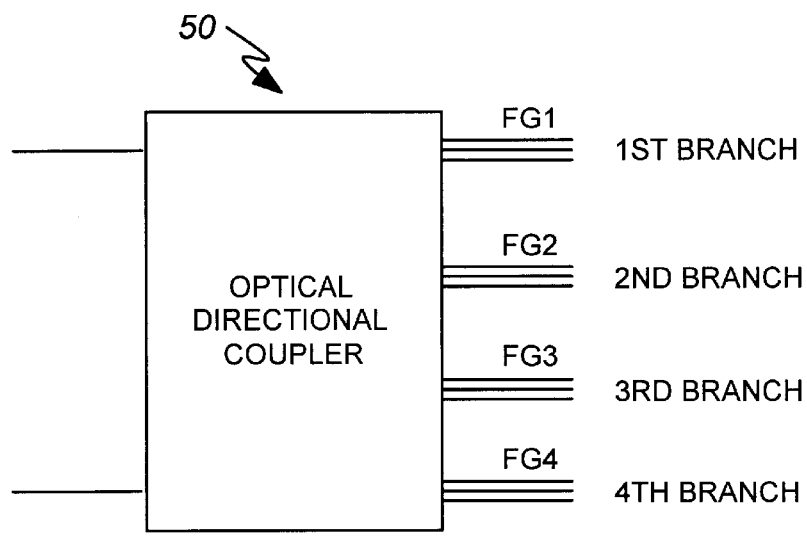
Figure 4B:
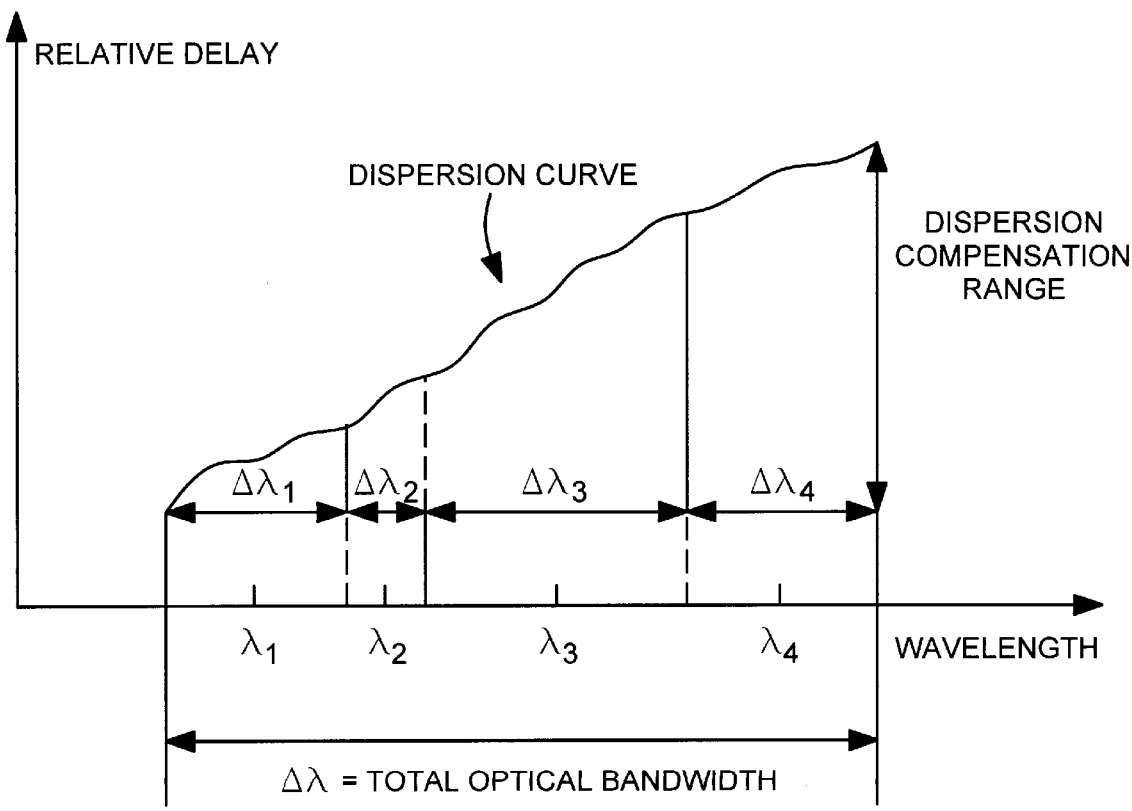

While the optical repeater 10 of the first embodiment has the dispersion equalizer 12 including three parallel fiber grating branches, the alternative embodiments of the repeater may include any other number of branches, e.g. four or five gratings coupled in parallel. A maximum number of gratings is determined by the required parameters of the repeater such as the total optical bandwidth for the grating stage, compactness and stability of operation. By way of example, FIG. 4a schematically shows an optical equalizer 50 having four parallel fiber grating branches. FIG. 4b shows one of several possible optical bandwidth and dispersion compensation curves for such equalizer. In the example shown, first grating FG1 provides chromatic dispersion compensation in the optical bandwidth $\Delta\lambda_1$ centered at $\lambda_1$ while gratings FG2, FG3 and FG4 compensate chromatic dispersion in respective optical bandwidths $\Delta\lambda_2$, $\Delta\lambda_3$ and $\Delta\lambda_4$ centered respectively at wavelengths $\lambda_2$, $\lambda_3$ and $\lambda_4$. Any other combination of grating bandwidths, in combination covering the required dispersion compensation range, is also possible. Gratings having linear or non-linear chirp may be utilized in the dispersion equalizer above.

Additional modifications to the repeater described above may include substitution of fibre gratings by other known types of gratings or other optical elements which would provide chromatic dispersion compensation within the necessary wavelength range. These modifications may include minor adjustments to the system and can be easily done by a person skilled in the art.

The scheme of the optical repeater 10 according to the first embodiment may be expanded for operation over a wider wavelength range, i.e. using multiple wavelengths, by connecting in series a plurality of appropriately tuned fiber gratings in each grating branch.

Figure 5:
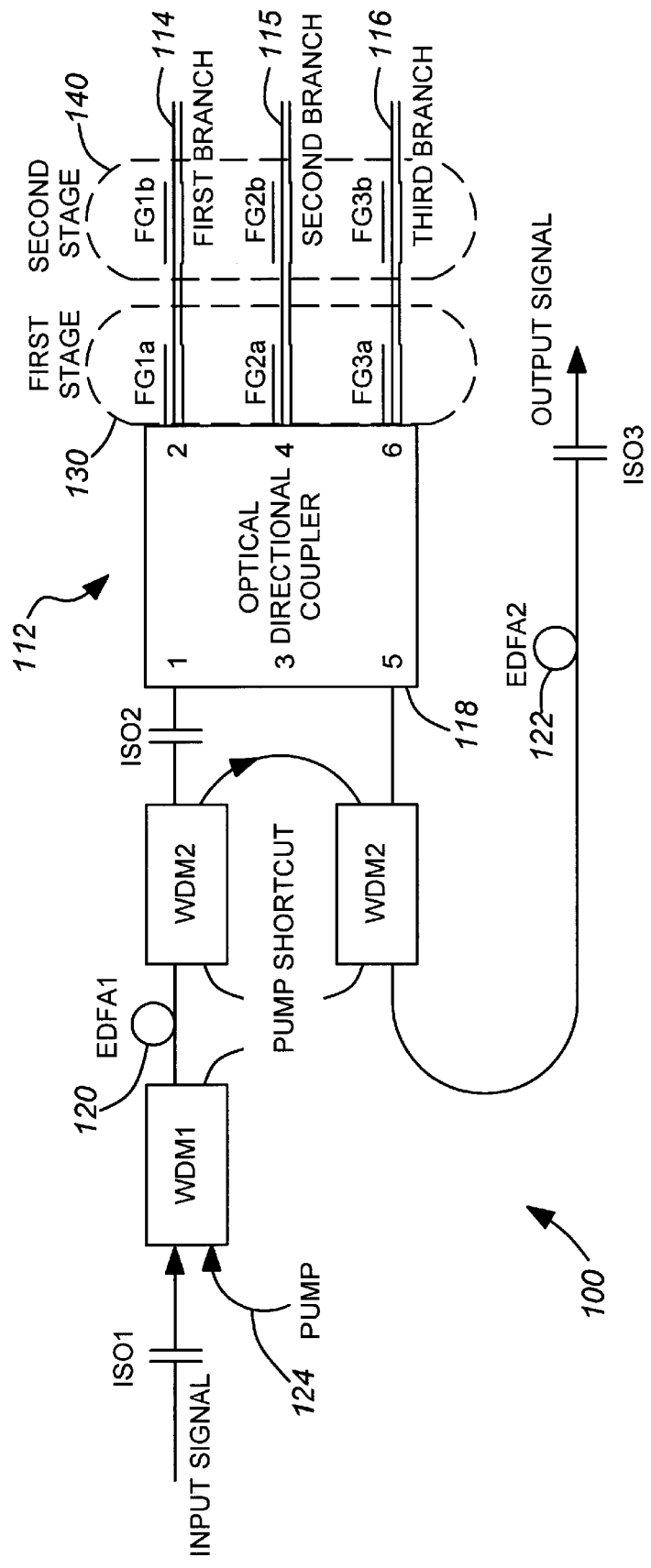
FIG. 5 shows an optical repeater according to a second embodiment of the present invention.

Thus, in an optical repeater 100 according to a second embodiment of the present invention for doubling the wavelength range of operation is shown in FIG. 5. This optical repeater 100 is similar to that shown in FIG. 1, and like elements are referred to by the same reference numeral incremented by 100, for example, dispersion equalizer 112 and first and second lengths of erbium doped fiber amplifier 120 and 122 pumped by a single common laser source 124. Wavelength selective couplers and optical isolators are provided similarly to those of the first embodiment. The optical repeater of the second embodiment differs from that of the first embodiment in that, instead of cascaded single gratings FG1, FG2 and FG3 in each of the branches 14, 15, 16 as shown in FIG. 1, each grating branch 114, 115 and 116 comprises a series of two fiber gratings, so that there is effectively a cascade of first and second grating stages 130 and 140, each grating stage being designed for a specific signal carrier wavelength range. Gratings designated FG1$a$, FG2$a$ and FG3$a$ and forming the first stage 130 are designed for a first combined optical bandwidth $\Delta\lambda_a$ centered at first wavelength $\lambda_{2a}$, and gratings designated FG1$b$, FG2$b$ and FG3$b$ and forming the second stage 140 are designed for a second combined optical bandwidth $\Delta\lambda_b$ centered at second wavelength $\lambda_{2b}$. With grating parameters indicated in the first embodiment, the chirp constant of each grating is in the range 0.23 nm to 0.25 nm. The length of each of the gratings FG1$a$ and FG1$b$ is 3.0 cm to 3.3 cm. The lengths of sections forming FG2$a$ and FG2$b$ are 6.0 cm to 6.6 cm where the first half of this length is regular fiber, without a grating, and the second half of this length represents the grating imprinted in the fiber. The lengths of sections forming FG3$a$ and FG3$b$ are 9.0 cm to 9.9 cm where the first $2/3$ of this length is a regular fiber, without a grating, and the third part of the length represents the imprinted grating. The total optical bandwidth of the three branch fiber grating equalizer for a selected signal carrier wavelength is about 0.63 nm to 0.70 nm. The principle of operation for the two cascaded stage optical repeater 100 is the same as for single stage repeater 10 of the first embodiment, but there is wavelength selection within each fiber grating stage for increased optical bandwidth coverage. Each fiber grating from each stage operates in the reflection regime for a given range of signal carrier wavelengths, while being essentially transparent for the other signal carrier wavelengths.

Figure 6:
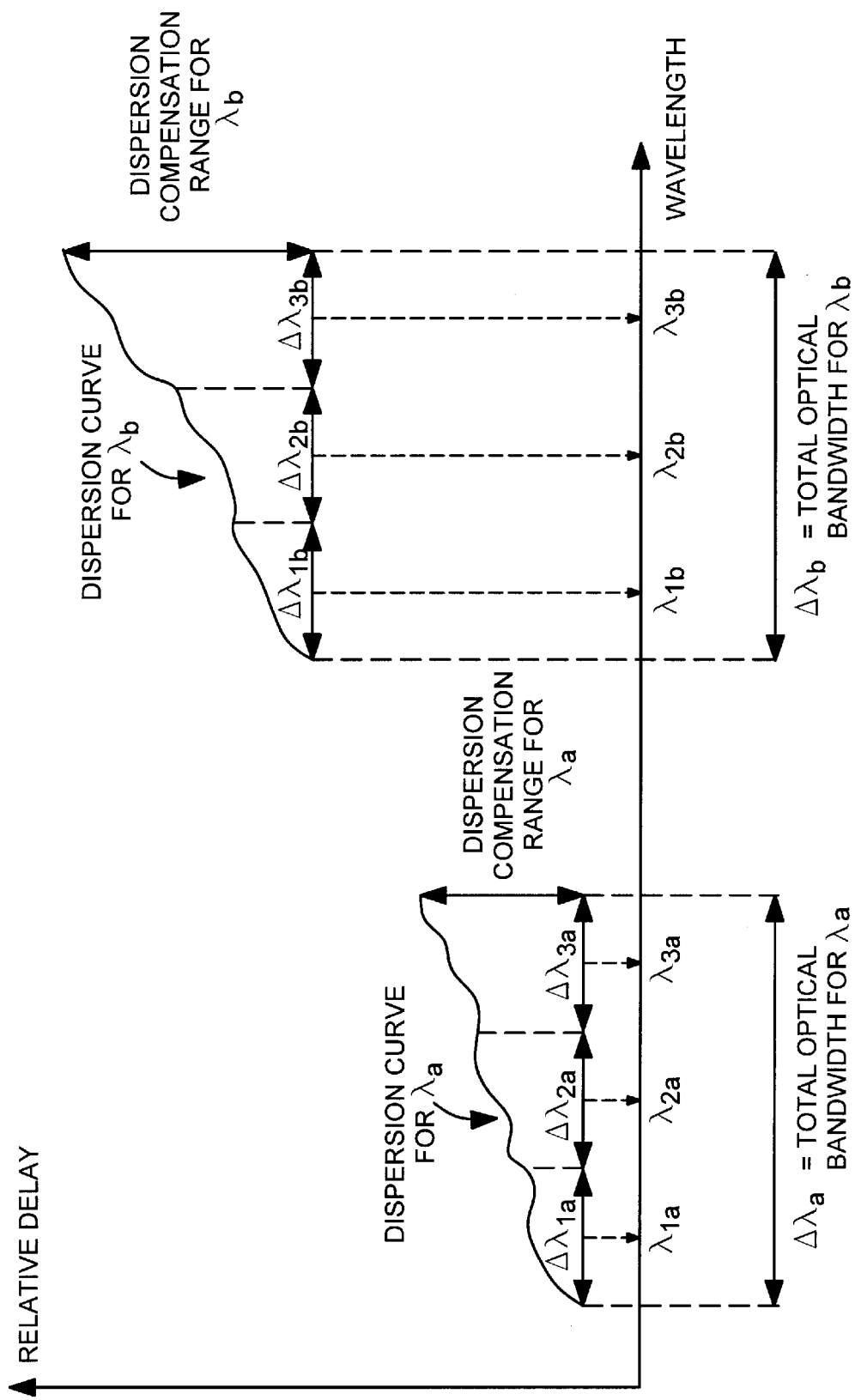
FIG. 6 shows an optical bandwidth and dispersion compensation curve for the optical repeater of the second embodiment.

Similar to the first embodiment, signal wavelengths $\lambda_{2a}$ and $\lambda_{2b}$ in the two cascaded stages scheme of FIG. 5 are at the center of the two total optical bandwidths for corresponding signal carrier wavelengths of the equalizer 112 as shown in FIG. 6. For example, the grating FG1$a$ is chirped to provide that the average product of its effective refractive index to the grating mechanical period corresponding to a wavelength $\lambda_{1a}/2$. The grating FG1$a$ provides selective reflection in an optical bandwidth $\Delta\lambda_{1a}$ centered at wavelength $\lambda_{1a}$ as illustrated in FIG. 6. At the same time, fiber gratings FG2$a$ and FG3$a$ are chirped to provide an average product of their effective refractive index to the grating mechanical period corresponding to wavelengths $\lambda_{2a}/2$ and $\lambda_{3a}/2$ respectively. Gratings FG2$a$ and FG3$a$ provide selective reflection in respective optical bandwidths $\Delta\lambda_{2a}$ and $\Delta\lambda_{3a}$ centered respectively at $\lambda_{2a}$ and $\lambda_{3a}$ so that the total optical bandwidth $\Delta\lambda_a$ of the equalizer 112 for the signal bandwidth centered at wavelength $\lambda_{2a}$ is combined optical bandwidths of the gratings FG1$a$, FG2$a$ and FG3$a$. Thus, in the optical repeater 100 according to the second embodiment of the invention the first cascaded stage 130 provides enhanced dispersion compensation for a first signal wavelength range centered at wavelength $\lambda_{2a}$, while the second stage 140 of fiber gratings provides enhanced dispersion compensation for a second signal wavelength range centered at wavelength $\lambda_{2b}$. The first and second dispersion compensated ranges for the first and second center signal wavelengths are equal to $\Delta\lambda_a=\Delta\lambda_{1_a}+\Delta\lambda_{2_a}+\Delta\lambda_{3_a}$ and $\Delta\lambda_b=\Delta\lambda_{1_b}+\Delta\lambda_{2_b}+\Delta\lambda_{3_b}$ correspondingly as illustrated in FIG. 6.

Figure 7:
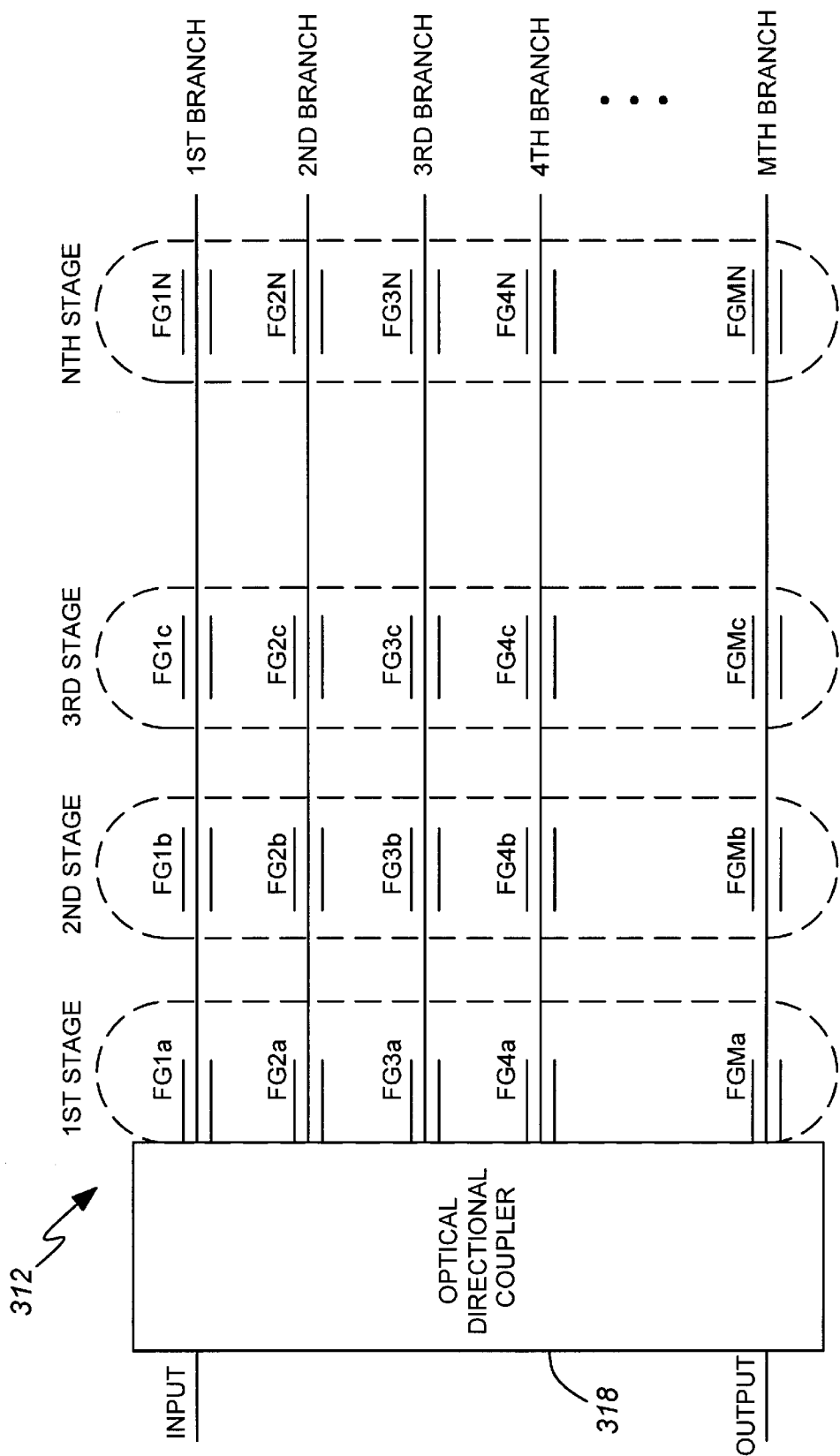
FIG. 7 shows an optical repeater for multiwavelength operation.

The two wavelength ranges $\Delta\lambda_a$ and $\Delta\lambda_b$ can be independent as represented in FIG. 6, or adjacent. As represented in FIG. 7, this means that the highest wavelength of operation for the first grating stage corresponds to the lowest range of operation for the second grating stage, i.e. $\lambda_{3_a}+(\Delta\lambda_{3_a}/2)=\lambda_{1b}-(\Delta\lambda_{1b}/2)$. In an alternative embodiment, the stages can be reversed so that the lowest wavelength of operation for the first grating stage corresponds to the highest range of operation for the second grating stage, i.e. $\lambda_{3_b}+(\Delta\lambda_{3_b}/2)=\lambda_{1a}-(\Delta\lambda_{1a}/2)$. In this manner, it is possible to obtain for dispersion equalizer 12 an enhanced continuous wavelength range of dispersion compensation. If all 6 gratings used in FIG. 5 are similar and arranged to provide dispersion compensation with continuous bandwidth coverage between the two stages as represented in FIG. 7, a six-fold bandwidth enhancement is obtained as compared to an equalizer using a single grating.

All the gratings operate in reflection mode for the incoming optical signal, with means that shorter wavelengths within the signal spectral width travel further into the grating than longer wavelengths, if gratings operate in the 1530 to 1560 nm region. As a result, the transmission delay between longer wavelengths and shorter wavelengths within the spectral width of the signal is compensated.

The optical repeater 100 employing the three branch dispersion equalizer 112 shown in FIG. 5 can operate with one or more signal carrier wavelengths within the ranges from $\lambda_{1_a}-(\Delta\lambda_{1_a}/2)$ to $\lambda_{3a}+(\Delta\lambda_{3a}/2)$ and from $\lambda_{1_b}-(\Delta\lambda_{1_b}/2)$ to $\lambda_{3b}+(\Delta\lambda_{3b}/2)$ in a manner described above.

The optical equalizer operates independently for each carrier wavelength and there is negligible mutual interaction between particular carrier wavelengths and gratings that do not belong to the stage that support this wavelength.

Thus the optical repeaters described above and shown schematically in FIGS. 1 and 5, compensate both losses and chromatic dispersion from a preceding optical fiber span, having e.g. a length of 80 km to 105 km, and a total chromatic dispersion of 1700 to 1800 ps/nm.

In each of the above described embodiments, fiber dispersion gratings are provided with a linear or nonlinear chirp with an average pitch equal to the desired Bragg resonant centre wavelength, divided by twice the effective refractive index of the signal carrier optical waveguide.

The total optical power of the pump is in the range from 13–16 dBm at a central wavelength of 980 nm. The total gain in EDFA1 and EDFA2 is in the range from 27 dB to 33 dB. The input signal level is no lower than −15 dBm at a carrier wavelength.

Thus an optical repeater is provided for single and multi wavelength operation comprising dispersion equalizer provided by a plurality of parallel cascaded optical fiber grating branches, coupled between first and second lengths of a fibre amplifier to a common pump source which enhances the optical bandwidth of a dispersion equalizer based on an optical fiber grating, and compensates for optical losses induced by the dispersion equalizer in a compact and efficient arrangement using a EDFA with a single pump source.

Other modifications similar to ones of the first embodiment listed above are also applicable to the second embodiment of the invention.

The optical repeater described above can be extended for operation over a wider wavelength range. Generally it may include a dispersion equalizer 312 schematically shown in FIG. 8 which has cascaded M optical fiber grating branches coupled in parallel through the optical coupler 318. Each of M branches has a series of N gratings, each grating being designed to selectively reflect one of the series of optical bandwidths near center wavelengths $\lambda_a, \lambda_b, \lambda_c, \ldots \lambda_N$, to form a cascade of N wavelength selective grating stages of M elements each. Each grating within the selective grating stage is chirped so that the total optical bandwidth of the equalizer for the selected stage is the combined optical bandwidths of the gratings within the stage. For example, as shown in FIG. 8, the first branch of the equalizer 312 includes gratings FG1a, FG1b, FG1c, ..., FG1N, each of them chirped in the manner described above to selectively reflect one of the series of above-mentioned wavelength ranges, and the first stage of gratings includes gratings FG1a, FG2a, FG3a, FG4a, ..., FGMa which provide dispersion compensation for the first wavelength range centered at $\lambda_a$.

Various modifications to the optical repeater structure described above are possible, including variations in number of branches and number of gratings in each branch. All the modifications similar to ones of the first and the second embodiments are applicable to the repeater for multi wavelength operation.

It will be appreciated that, while specific embodiments of the invention are described in detail above, numerous variations and modifications of these embodiments fall within the scope of the invention as described in the following claims.

What is claimed is:

1. An optical repeater, comprising:

a dispersion equalizer comprising an optical coupler having an input port, an output port and cascaded M optical fiber grating branches coupled in parallel through the optical coupler, and first and second lengths of an optical fiber amplifier coupled to the input port and output port respectively of the optical coupler, means for coupling an input optical signal into the first section of the optical fiber amplifier and means for coupling an output optical signal from the second section of the optical fiber amplifier, each of M optical fiber grating branches comprising a series of N gratings, each grating being designed to selectively reflect one of the series of signal carrier wavelengths $\lambda_a, \lambda_b, \lambda_c, \ldots \lambda_N$, to form a cascade of N wavelength selective grating stages of M elements each, each grating within the grating stage being chirped so that the total optical bandwidth of the equalizer for the grating stage is the combined optical bandwidths of the gratings within the stage.

2. An optical repeater according to claim 1, wherein N=1, each optical fiber grating branch comprising a single grating to form a cascaded wavelength selective grating stage of M gratings.

3. An optical repeater according to claim 2 wherein M=3, the dispersion equalizer comprising first, second and third gratings.

4. An optical repeater according to claim 1 wherein M=3 and N=2.

5. An optical repeater according to claim 1 wherein M=3 and N=3.

6. An optical repeater according to claim 1 wherein M=3 and N=4.

7. An optical repeater according to claim 1 wherein M=4 and N=4.

8. An optical repeater according to claim 1 wherein the gratings have equal bandwidths.

9. An optical repeater according to claim 1 wherein the gratings have unequal bandwidths.

10. An optical repeater according to claim 1 wherein the first and second lengths of the fiber amplifier are coupled to a single laser pump source.

11. An optical repeater according to claim 1 wherein each grating is an in-fiber Bragg grating with linear chirp.

12. An optical repeater according to claim 1 wherein each grating is a fiber grating with non-linear chirp.

13. An optical repeater according to claim 1 wherein the first and second lengths of the optical fiber amplifier comprise first and second lengths of erbium doped fiber.

14. A dispersion equalizer, comprising:

an optical coupler having an input port, an output port and cascaded M optical fiber grating branches coupled in parallel through the optical coupler, each of M optical fiber grating branches comprising a series of N gratings, each gratings being designed to selectively reflect one of the series of signal carrier wavelengths $\lambda_a, \lambda_b, \lambda_c, \ldots \lambda_N$, to form a cascade of N wavelength selective grating stages of M elements each, each grating within the grating stage being chirped so that the total optical bandwidth of the equalizer for the stage is the combined optical bandwidths of the gratings within the stage.

15. A dispersion equalizer according to claim 14, wherein N=1, each optical fiber grating branch comprising a single grating to form a matched stage of M gratings.

16. A dispersion equalizer according to claim 15 wherein M=3, comprising first, second and third gratings.

* * * * *